United States Patent [19]

Henquet et al.

[11] 3,748,392

[45] July 24, 1973

[54] CENTRAL METERING SYSTEM FOR AUTOMATIC TELEPHONE EXCHANGES

[75] Inventors: Andre Jean Henquet; Roger Mugnier, both of Boulogne, France

[73] Assignee: International Standard Electric Corporation, New York, N.Y.

[22] Filed: Mar. 22, 1971

[21] Appl. No.: 126,547

[30] Foreign Application Priority Data

Mar. 26, 1970 France .............................. 7010892

[52] U.S. Cl. .............................................. 179/7 MM

[51] Int. Cl. .............................................. H04m 15/10

[58] Field of Search........... 179/7 R, 7 MM, 7.1 TP, 179/8 R

[56] References Cited

UNITED STATES PATENTS

| | | | |
|---|---|---|---|
| 3,626,099 | 12/1971 | Le Bellec | 179/7 R |
| 3,514,540 | 5/1970 | Widdel | 179/7 R |
| 3,342,940 | 9/1967 | Gattner et al. | 179/7 R |
| 3,560,658 | 2/1971 | Molloy et al. | 179/7 R |
| 3,480,732 | 11/1969 | Baur et al. | 179/7 R |
| 3,122,611 | 2/1964 | Wheeler | 179/7 R |
| 3,582,558 | 6/1971 | Jurcazak | 179/7.1 TP |
| 3,595,986 | 7/1971 | Pullach | 179/7 MM X |

FOREIGN PATENTS OR APPLICATIONS

| | | | |
|---|---|---|---|
| 853,119 | 11/1960 | Great Britain | 179/7 R |

*Primary Examiner*—Thomas W. Brown
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

An automatic toll ticketing system is disclosed. For each toll call, a centralized metering circuit including a memory unit is connected via a selection coupler to a calling line identifier which identifies the calling line and the recording unit. The unit transfers the calling line identity into its memory. Identity of a trunk is provided to a cell dedicated to that trunk in the memory of the centralized metering circuit. Call information is transmitted by the centralized metering circuit to peripheral memory apparatus at the end of a call.

3 Claims, 5 Drawing Figures

*Inventor*

A. J. HENQUET-R. MUGNIER

By *O. O. Warner*

*Attorney*

PATENTED JUL 24 1973 3,748,392

CENTRAL METERING SYSTEM FOR AUTOMATIC TELEPHONE EXCHANGES

Figure 1:
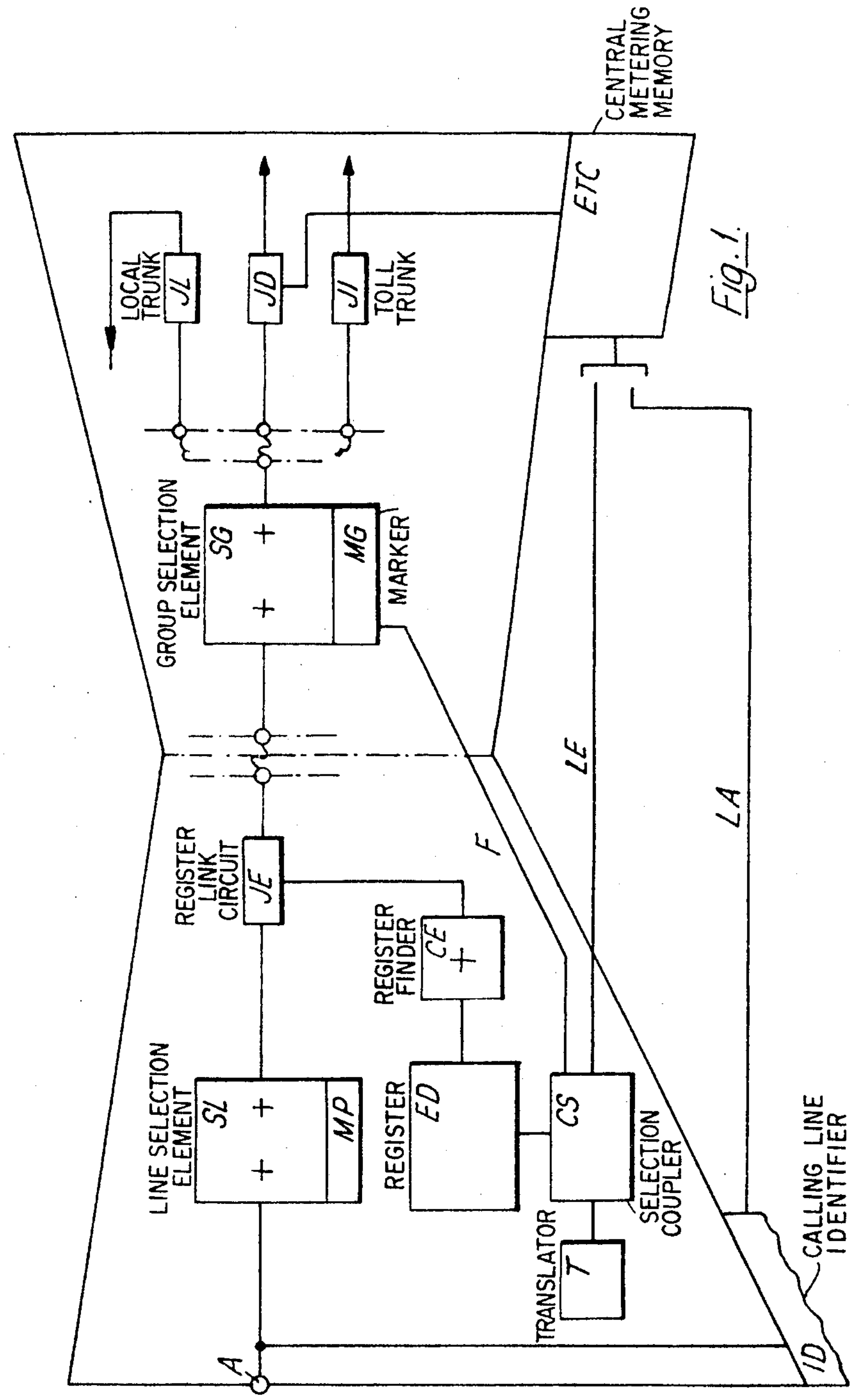

The present invention relates to a centralized registering system for metering communication messages which is particularly applicable in automatic telephone exchanges.

The system has been designed for use specifically with a crossbar switching system called the ITT Pentaconta system, but may be fitted to any switching system using registers.

The present invention relates more particularly to a centralized metering system wherein metering information is grouped to form a unique message which is registered at the end of the communication. From a collection of such messages subscriber bill notes are established in an accounting center.

It is already known, particularly in the French Pat. No. 1,557,094, that particular metering systems may be used for the registration of metering information. Logic-memory units, called ETC, capable of being connected to the exchange registers and to supervise the trunk circuits are used, each ETC being connected to a magnetic tape register or a teleprinter. The applicants propose to improve and to simplify, particularly in systems of this type, the process of storing the initial metering information in the ETC. Initial information means receive the calling subscriber number, and eventually the called subscriber number, the conversation trunk circuit number, the category of the calling subscriber, the metering rate and the mode.

In presently known systems, the register is used as the first item for grouping such information. In register controlled conjugate selection exchanges, the register is often the circuit which collects, in normal operation, most of the information concerning the communication to be established. Thus it is frequently necessary to modify such information in order to constitute the initial metering information. For example, consider the situation relative to the calling subscriber identity. With the register having the trunk circuit under its control up to the completion of the communication establishment, it is easy to have such information transferred into the ETC before the beginning of the conversation. However, such a process presents several drawbacks such as presenting the need to modify numerous register circuits which have an already sufficiently complex operation. A further drawback is the need to provide an intermediate registration of the calling subscriber identity which is cumbersome and may result in errors.

A major object of the invention is to use a more simple information storing process which needs only to bring minor modifications to a relatively small number of circuits or items in the exchange. According to the invention those items are the selection couplers or junctors, which are described in the French Pat. No. 1,133,024 and particularly in its first French Pat. of addition No. 71,755. Such selection couplers concentrate the traffic between the registers and connector bus lines and are thus more numerous than the registers, e.g., by a 6 to 1 ratio.

Moreover, according to the invention, it is provided that all the information does not pass across the couplers, but that for some information elements such as the calling subscriber number and trunk circuit number, the couplers direct the circuits, where they are determined, to enter directly in relation with the ETC at a time prescribed by the couplers. Thus the coupler directs the calling line identifier towards the ETC. Otherwise, each trunk circuit has a fixed zone in the ETC memory in the same manner as described in the French Pat. application PV No. 175,519 filed on Nov. 27, 1968, by the applicant. Therefrom it results that the coupler must only store the metering rate and the ETC and identifier coordinates. Thus the modifications necessary to complete the storage are relatively simple.

According to a feature of the present invention, in a telephone exchange of the Pentaconta type, where the common control circuits comprise registers, markers and couplers communicating each with the other by means of connector bus lines, there is provided a centralized metering system comprising logic-memory units able to store the metering information, to supervise the trunk circuits and to develop metering messages. Calling line identifiers and translators of number prefix are arranged in such a manner that on each call occurrence the centralized metering unit, called ETC, which supervises the trunk circuit concerned by the call, is connected to the coupler dealing with the call. The coupler extends the ETC-coupler connection towards the identifier dealing with the said call. The said identifier, if it is free, identifies successively the said ETC and the calling line. The transfer of the calling line identity and the metering rate is made by the said ETC when the coupler has caused the said trunk circuit to be marked.

Other features of the invention will appear from the following detailed description. The description and drawings are only given by way of example and are not intended to constitute any limitation on the invention.

Figure 2:
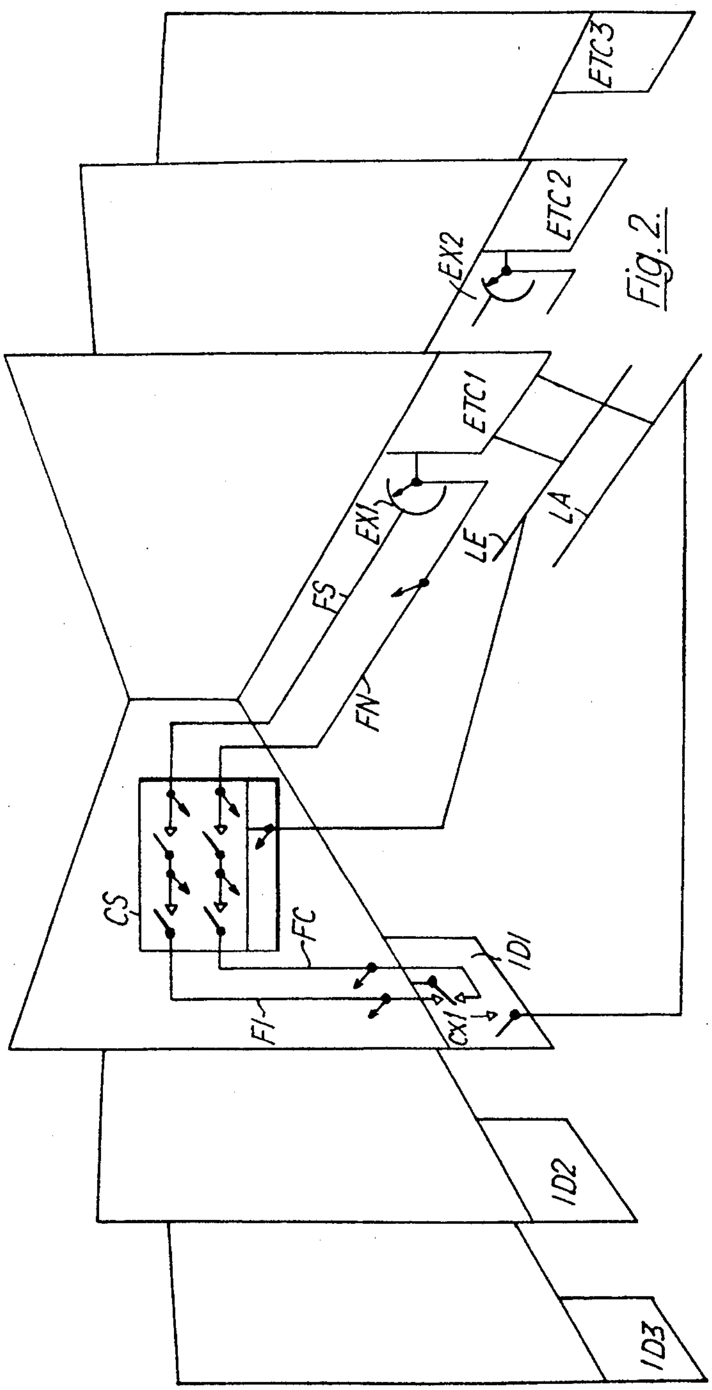
Figure 3:
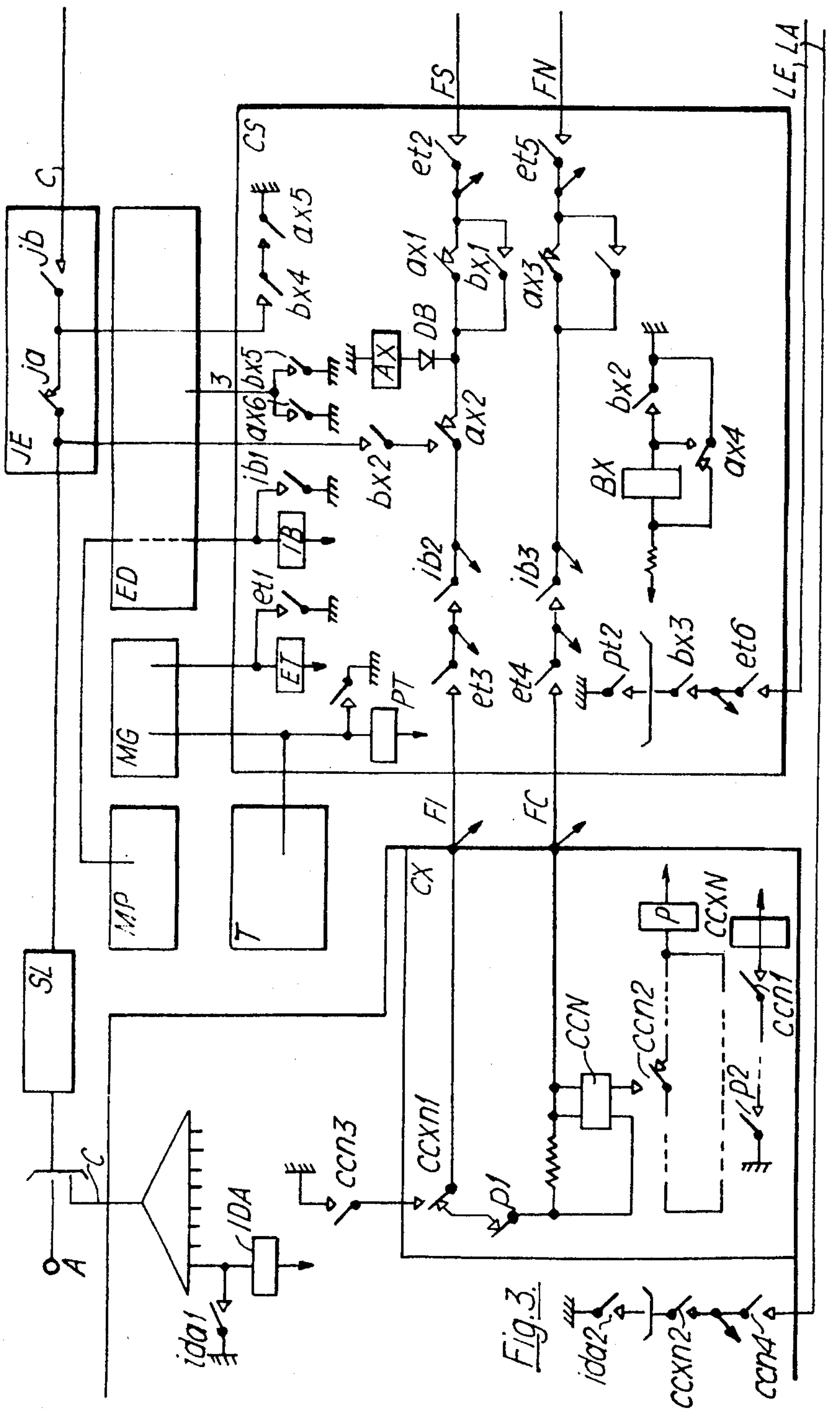
Figures 4, 5:
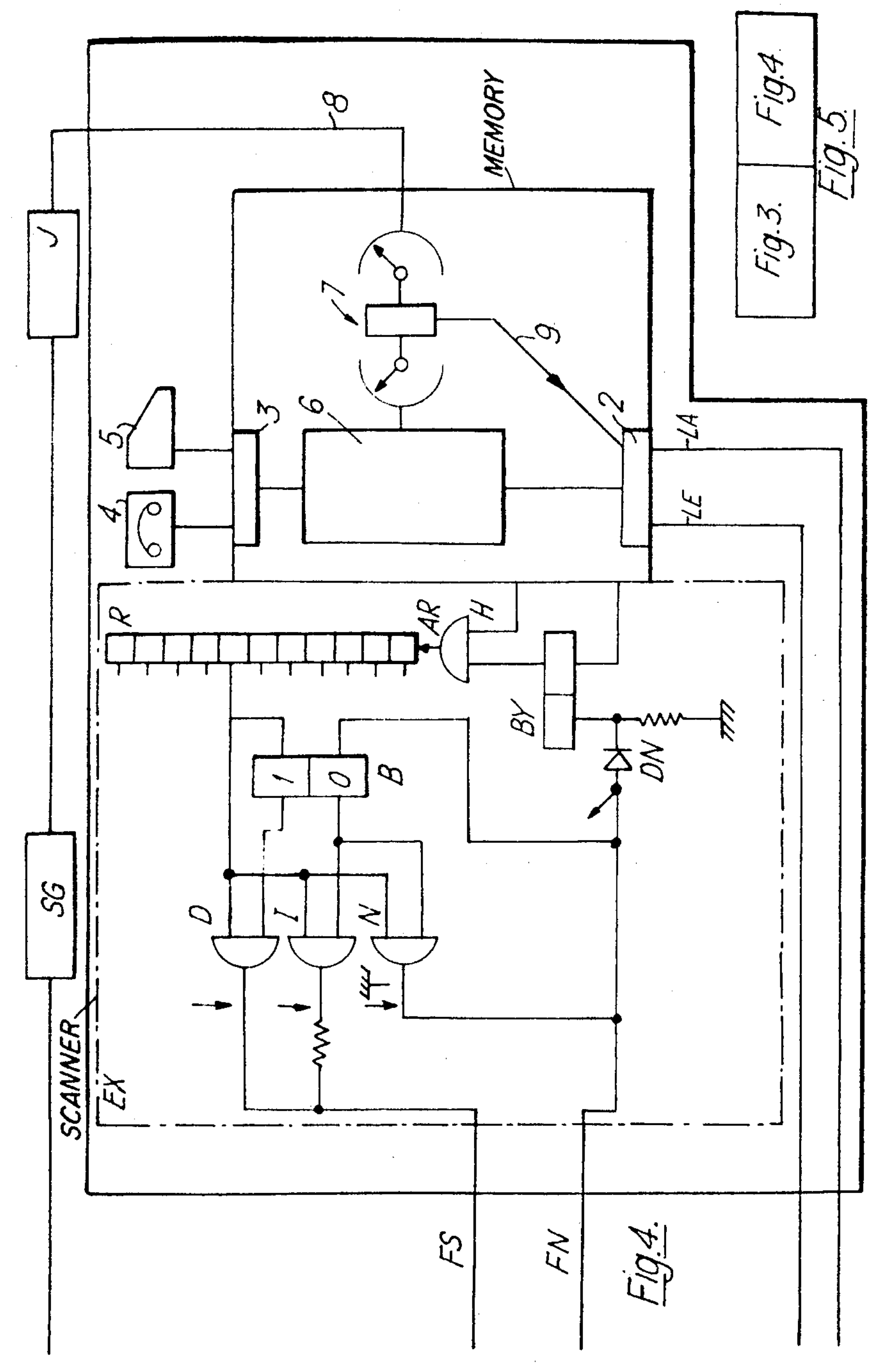

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 shows a schematic block diagram illustrating a metering system used with a telephone exchange according to the invention, FIG. 2 shows a block diagram illustrating the types of liaison between the various elements of the metering system, and the couplers and the identifiers, FIG. 3 shows the details of characteristic parts of an embodiment according to the invention, FIG. 4 shows schematically a centralized metering unit ETC and its liaisons with the parts of the FIG. 3, and FIG. 5 shows how FIGS. 3 and 4 must be connected.

FIG. 1 shows one part of a local Pentaconta exchange which permits the connection of a calling subscriber A to a trunk circuit such as JL, JD or JI. The detailed operation of this exchange part is completely described in the book entitled "The crossbar systems in telephony - 1. the Pentaconta" by Roger Legare and Albert Delbouys, issued by the Editions Eyrolles in 1969. However, to make easier an understanding of the exemplary embodiment, according to the invention, which is to be described, the major phases of establishment of a link between a subscriber A and a trunk circuit will be hereunder summarized.

When the subscriber A proceeds to call, the preselection — See Chapter V of the above mentioned book — establishes a first connection between A and a register ED, via a line selection element SL, a register link circuit JE and a register finder CE. Then the dialling phase corresponds to the registration in ED of the number called by A. Finally, the group selection phase - See Chapter VI of the mentioned book — establishes a connection between the link circuit already used during the preselection phase and a trunk circuit JL, JD or JI, depending on the called subscriber number, via a group selection element SG.

During the group selection phase, the circuits of the exchange control unit such as the register ED, the translator T which determines the selection code and the metering level from the first figures or prefix PQ or PQM of the called subscriber, the markers MG of the gorup selection element intercommunicate by means of two associated circuits: the selection coupler CS, sometimes called junctors, and the selection connector bus line F.

It is however to be noted that the translator T is active only for the local communications, and not for toll communications. Indeed, in the last case, as soon as two figures are received which indicate that the calling subscriber has asked for an access to the toll telephone network, the register ED controls the selection of a toll trunk circuit JI before having the subscriber invited to dial the called subscriber number which in transmitted directly towards the toll exchange.

It is known that in a centralized registering system for metering messages of communication it is necessary to collect together the following information: calling subscriber number, conversation trunk circuit identity, calling subscriber category, metering mode and rate, and eventually called subscriber number. In the system according to the invention, logic-memory units are provided, which have been called ETC and which store before the beginning of the conversation the metering information, then supervise the concerned trunk circuits, the various conditions of the trunk circuit defining the beginning, eventually the reception of metering pulses provided by the toll exchange, and the end of the conversation. On the other hand the calling subscriber number is provided by subscriber identifiers ID connected to the subscriber line circuits.

The first part of the following description relates to the storing of the metering information. To make the description easier an ETC of the type described in the French Pat. application PV No. 175,519 as mentioned above, will be considered. This ETC has a memory cell assigned to a trunk circuit and reciprocally. Thus the trunk circuit identity is available without need of decoding and corresponds to the assigned cell address. Therefore the storing problem consists in collecting the rest of the metering information in the assigned cell when the trunk circuit becomes busy.

In the local exchange of FIG. 1 the specific moment when a trunk circuit is rendered busy is when the trunk circuit category code is transmitted to the register ED, via the bus line F and the selection coupler CS.

Effectively the group selection phases include the following operations:

- check and holding of a primary selector of SG;
- engagement of the selected primary section of SG;
- holding of a marker MG;
- holding of a coupler CS to reach the translator T and to transmit to it the figures PQ or PQM, and holding of a connector bus line towards the marker MG;
- selection code transmission to the marker MG via the coupler CS, the bus line F, then release of the bus line F;
- marking of an outgoing direction by the marker MG;
- selection of a secondary section of SG;
- search of an appropriate trunk circuit JL, JD or JI;
- check of the selected trunk circuit;
- identification of the trunk circuit by the marker MG;
- second holding of the bus line F and transmission of the category of the selected trunk line by the marker MG to the register ED via F and the coupler CS;
- positioning of the vertical bars.

It is to be noted that between the selection code transmission to the marker MG and the trunk circuit category transmission by the marker MG, the coupler CS is being connected to the register ED. The information which has passed across the coupler is the selection code provided by the translator T and the trunk circuit category.

According to the invention it is intended to modify the trunk circuit category so that it also includes the identity of the ETC assigned to supervise it. Such a modification is relatively simple when an ETC supervises a single category of trunk circuits. Thus, as an example, in a local exchange of 10,000 lines there may be 400 trunk circuits JL, 400 trunk circuits JD and 80 trunk circuits JI, being considered that an ETC can supervise as many as 1,000 trunk circuits.

Also according to the invention, it is provided that the translator T, at the same time as it provides the selection code, provides in addition the metering level. Indeed the figures PQ enable the computation of this level. It is to be noted that, in the case of a toll communication, the translator is not interrogated, but that the metering pulses are transmitted to the trunk circuit by the toll exchange.

It is also to be noted that, during the preselection phase, the register ED has registered the line category of the subscriber A which has been transmitted to it by the preselection marker MP - See the Chapter V: the Preselection, of the above mentioned book -. According to the invention, it is provided to modify the markers MP in such a manner that such an identity includes in addition the reference of the identifier ID of the group of the lines which comprises the calling subscriber line A.

Finally according to the invention, means are provided to modify the coupler CS by adding in it memory relays capable of storing the identity of the ETC, of the ID dealing with the call as well as the metering level when they pass across it. Obviously it is necessary to provide also additional wires between ED and CS for transmitting the identity of ID.

In such conditions, at the moment when the trunk circuit category is transmitted, or more precisely at the moment which immediately follows it, the coupler CS possesses the above mentioned information. Moreover there is existing via the preselection links between the register ED and the calling subscriber line circuit A, a connection wire constituted by the wire C. According to the invention it is provided to extend the wire C of this connection, on the one hand, toward the identifier ID and, on the other hand, toward the coupler CS where a marking voltage is applied to the wire C as soon as the trunk circuit category has been received. As soon as the wire C is so marked, the identifier ID proceeds with the identification of the calling subscriber.

To summarize, after the phase of trunk circuit category transmission, the coupler CS and the identifier ID have together stored all the information to be transmitted to the ETC. The links LA and LE are provided in this respect between ID and ETC, and between CS and ETC, respectively.

The last phase of the group selection consists in positioning the selection bars of SG; then, for example there is a connection between the register ED and the trunk circuit JD,. The wire C of such a connection is, according to the invention, extended, on the one hand, from the trunk circuit to the ETC and, on the other hand, towards the coupler CS where a marking voltage is applied to the said wire C. The ETC detects the marking for example, as it is described in the French Pat. application PV No. 175,519, already mentioned hereabove, the ETC proceeds to store in its memory the information available over the links LA and LE which are directed to the memory cell assigned to the trunk circuit marked; then the ETC starts the supervision of the marked trunk circuit. As soon as the information is stored in the ETC memory, the coupler CS and the register ED complete as currently the intercommunication between the calling subscriber and the trunk circuit. . The supervision is carried on as it is described in the above mentioned French patent application.

The above described operation corresponds to the case of an exchange wherein only one communication would be established at a time. Currently, several communications are simultaneously established which implies that several couplers CS operate simultaneously. Moreover the number of the trunk circuits is high which renders it necessary to provide several ETC for supervising them. At last, the subscribers are so many that it is also necessary to provide several identifiers ID. The FIG. 2 shows an arrangement of this type. It implies an operation of selection between the ETC, CS and ID in such a manner that the ETC corresponding to a trunk circuit which is marked, be connected to the CS and the ID dealing with the communication invoving the said marked trunk circuit.

To each ETC is associated a scanner EX. Thus with ETC1 there is EX1, with ETC2 there is EX2, etc. Each scanner EX comprises output wires FS each connected to a coupler CS of the exchange. In the FIG. 2 only one coupler is shown to make it easier to understand of the embodiment. Permanently the scanner EX scans the wires FS as long as it is not stopped and held locked by a marking over the end of scan wire FN. The wire FN is connected in parallel to each coupler CS.

Each identifier ID includes a selection circuit which has as many input wires FI and output wires FC as ETCs, each wire FI and FC being connected in parallel to any coupler CS. Each coupler CS is provided with switching means to connect, on the one hand, the wire FS to the wire FI corresponding to the ETC and the ID dealing with the call handled by the coupler and, on the other hand, the wire FC to the wire FN in the same conditions. Each selection circuit CX is provided with switching means to selectively choose a marked wire FI, among several ones, and to connect the said wire FI to the corresponding wire FC. The loop formed by the wires FS, FI, FC and FN enables, at the moment when the scanner marks the wire FS, to lock the said scanner EX by marking the wire FN. The switching means of CS comprise relay contacts corresponding individiually to the ETC and the ID, the said relays to operate having been operated, as previously mentioned, on the transmission of the trunk circuit category and on the retistration of the subscriber category, respectively. The switching means of CX comprise selection relays with a current priority contact chain. The coupler CS has a detection relay which detects the marking signal over the loop of the wires FS, FI, FC and FN and which enable it to proceed with the identification of A by ID. At last, ID and CS are respectively provided with connection means to be connected to the input links LA and LE of the ETCs.

The operation of those items and circuits will now be described in relation with the FIG. 2. After the transmission of the trunk circuit category, the coupler CS has stored the identity of the ID associated with the calling subscriber, the identity of the ETC associated with the trunk circuit and, eventually the metering level. The switching means of CS connect the wire FS from the ETC to the wire FI corresponding to the said ETC towards the ID. In the same manner the wire FC corresponding to the said ETC in the ID is connected to the wire FN towards the said ETC. In the course of its scanning process, the scanner EX applies successively a positive voltage to the wires FS, for example + 48V. When the wire FS corresponding to the said coupler CS is reached, the positive voltage is applied through the said coupler CS to the selection circuit CX in the ID. The said circuit CX is necessary because several subscribers in the group associated with the ID can be simultaneously handled by the exchange, but, through different couplers. However, if several positive signals are simultaneously applied to a CX by several couplers, they are initiated in different ETCs since one ETC checks by its scanner EX only one coupler CS at a time. The selection circuit CX selects a pair of wires FS and FC and connects them. The positive signal is then applied to the stopping circuit of EX. When stopped, EX applies a negative signal to FS, for example - 48V, and the ground potential to the wire FN. The negative signal in CS causes the detection relay AX to operate which, on the one hand, causes by the preselection wire C (as described in relation with the FIG. 1) the identification of A in ID and, on the other hand, causes the connection of the information stored in CS to the input link LE. The ground potential over the wire FN insures the holding of the CX relays and causes, the connection of this information to the input link, when the identification of A is completed. Then the last phase of the group selection by the exchange control circuits, as in relation with the FIG. 1, causes the ETC to be marked via the trunk circuit. Then the ETC stores the information delivered by the links LA and LE and supervises the trunk circuit.

FIGS. 3 and 4 positioned as shown by the FIG. 5, illustrate the details of the items or circuits of which the general operation has just been described. In the coupler CS, FIG. 3, is shown the information memory relays, i.e., the relay IB giving the identity of the ID associated with the calling subscriber, the relay ET giving the identity of the ETC associated with the trunk circuit and the relay PT giving the metering level. The relay IB is operated by the preselection marker MP through the register ED, when the subscriber category is transmitted; it is held operated by its make contact ib1 and the ground potential. The relay ET is operated by the selection marker MG, when the trunk circuit category is transmitted; it is held operated by its make contact et1 and the ground potential. The relay PT is operated by the translator T, when the selection code is transmitted; it is held operated by its make contact pt1 and the ground potential.

The relay AX is the detection relay of the coupler. In CS the wire FS is connected to the wire FI by the make contact et2, the break contact ax1, the break contact ax2, the make contact ib2 and the make contact et3. On the other hand, the wire FC is connected to the wire FN by the make contact et4, the make contact ib3, the break contact ax3 and the make contact et5.

The scanner EX, shown in the FIG. 4, comprises a ring shift register R having as many as cells as couplers CS and, at each cell output, a set of three gates D, I and N and a bistable circuit B. A gate AR is also provided of which the input H receives the forwarding pulses for the register R and the other input is connected to the output of a bistable circuit BY. The gate AR output is connected to R. The bistable circuit B has a first input connected to the cell output and a second one to the wire FN.

The gate D, I, and N each have the first input connected to the cell output, and the second input connected respectively to the first B output, the second B output and the second B output. When they are opened, the gates D, I and N apply to their outputs respectively the potentials of + 48V, − 48V and the ground potential. When the register R activates the cell, the output signal through the first B input sets the bistable circuit in the condition 1, as shown. The output 1 of B and the cell output signal unlock the gate D with the result of a potential of +48V being applied over the wire FS. If the coupler is handling a call at that time, which is not in the phase of trunk circuit category transmission or which does not concern a trunk circuit associated with the ETC, the potential does not extend beyond FS and nothing occurs over FN. At the next pulse on the input H the register steps forward to the next cell. On the contrary, if the coupler CS is handling a call concerning a trunk circuit associated with the ETC and if it has received the category code, the wires FS and FI shown in the FIG. 3 are connected and the potential reaches the circuit CX of the ID concerned by the call.

The selection circuit CX (FIG. 3) comprises a free condition relay P, and as many relays CC as wires FI, that is to say as ETCs. To each relay CC is alloted an index corresponding to the rank given to each ETC. The relay CCn corresponds to the ETC of rank *n*. If several couplers CS simultaneously are calling CX, a selection must be made and only one relay CC must be held operated. The problem of the multiple access to one circuit by several circuits must be solved. The principle of the solution is shown in the above mentioned book, in the Chapter IV, paragraph 4.1. The calling of CX is determined by the occurrence of potential over FI. If CX is free, the relay P is not operated and its break contact p1 is closed. The relay CC*n* and its auxiliary CCX*n* are not operated. The wire FS is then extended to the left coil of CCn via the break contacts *ccxn*1 and *p*1. The second end of the left coil of CC*n* is connected to FC to which is applied a ground potential by FN, via the diode DN. The relay CCn or preferably all the relays CC of the ETC, which are calling, are operated. Each relay CC operated by its left circuit gets a holding circuit, not depending on the calling circuit, through the relay P. This holding circuit goes through the chain of break contacts ccn2 and the results are that only the relay CC with the lowest index, for example, can be held by its right coil in series with the relay P. The operation of P causes the opening of the free condition circuit of CX by its contacts *p*1. Then all the other relays CC release.

In the meantime within EX (FIG. 4), the positive potential has reached the left input of the bistable circuit BY which changes its condition. The output of BY being no longer marked, the gate AR shut off. The forwarding move of R is interrupted. On the other hand, the input O of B is activated and B changes its condition. By its output *O*, B turns on I and N while D is shut off. I applies a potential of - 48V over FS; - 48V and N applies a direct ground potential to FN. Such ground potential on FN holds in CX the relay CC*n* operated (FIG. 3). The negative potential on FS operates AX through the diode DB of the coupler CS. The relay AX has an auxiliary BX which is operated with AX via ground, make contact *ax*4, coil of BX, load resistor and battery potential of CS. The relay AX is held operated by the battery of FS and the make contact *bx*1. By the opening of the inverter contact *ax*2, the wires FS and FI are disconnected.

The identification phase may be started in ID. The relay CCX*n* is operated by ground, make contact *p*2 and make contact ccn1. The make contact of the inverter *ccxn*1 and the make contact *c*cn3 extend the wire FI toward the identification matrix of ID. In the coupler CS, the make contact of the inverter *ax*2 connects through the register ED the wire FI to the wire C of the chain of preselection, which is also extended to the matrix of ID.

The identity of A is translated by polarities on the group of wires IDA. Here it has been assumed that the polarities are applied by memory relay contacts. Via the make contacts *ccn*4 and *ccxn*2, the polarities are applied to the link LA.

In the coupler CS, the make contacts *pt*2 of the metering level relays PT apply, via the make contacts *bx*3 and *et*6, polarities to the link LE.

After the operation of the vertical bars in SG (FIG. 4), a ground potential is applied to the wire C of the trunk circuit via the make contacts *ax*5 and bx4.

Thus the trunk circuit is marked which causes the storage of the information existing on the links LA and LE, in the ETC memory cell corresponding to the trunk circuit.

The connections from the coupler CS toward the wires C of the calling line and of the trunk circuit are made through the register and the link circuit JE concerned. The said wires C are connected by the contacts *ja* and *jb* not shown of the relays JA and JB which by the combination of their status indicate the current operation condition. Particularly the selection condition during which the identification signals are transmitted on the two wires C is characterized by the opening of contact *ja* and closure of contact *jb*, thereby cutting the connection between the two wires C and permitting the transmission of identification signals to be sent separately on each of two wires.

As an example, the ETC comprises a memory and computer device of the same type as the one described in relation to the above mentioned French patent application.

The device shown in the FIG. 4 comprises a memory 6 with its input register 2 and output register 3 toward peripheric equipment such as the tape recorders 4 or the teleprinters 5. The memory 6 includes as many cells as trunk circuits to be supervised by the ETC 6. A cyclic scanning device 7 scans the cells in synchronization with the trunk circuits J via the wires 8, each wire 8 extending the wire C of the trunk circuit. When the scanning device 7 reaches a trunk circuit which has its wire C marked, it controls through the connection 9 the input into 2 of the information existing on LA and LE, then it controls their storage in the corresponding memory cell.

After having so stored the information and, after having checked their parity or another criteria, the ETC transmits a signal to the right input of the bistable circuit BY which changes its condition and again applies a marking to its output. The gate AR is turned on and allows the next clock pulse to go through; then the register R steps forward by one cell. The negative potential being removed from FS, the relay AX (FIG. 3) is released.

The break contact *ax*4 (FIG. 3) shunts the relay BX which is released a little later. The make contacts *ax*6 and *bx*5 are opened and so the ground potential which was applied to the holding wire disappears which causes the release, as in normal conditions, of the coupler CS and the register ED. Such a release control is necessary because there is a risk,, in case an ID is called by several couplers, that the coupler which has the last priority would have completed its switching operation before the information is stored in the ETC.

As an example, the identifier ID includes means for applying an identification signal made of a ground potential which will be applied to the wire FI by the contacts of the relays CC*n* and CCX*n*. As soon as the relays AX and BX are operated in the selection coupler CS, the said ground potential will be applied to the wire C by the line selection element, the extension of the wire C of the line toward the identifier being connected to a matrix of magnetic toroids, for example via a distributor. When the potential is received, it is translated in such a manner as to simultaneously provide the four last figures of the subscriber call number, in a coded form which can be checked, in applying polarities on the transmission wires to the concerned ETC.

As soon as the information is registered, the ETC scans the trunk circuit to detect the called subscriber response signal, which signal initiates the metering process.

Many cases may occur:

1. The communication is local and is not charged according to the duration. The concerned local trunk circuit is a trunk circuit JL. When the called subscriber goes off - hook, a metering message (calling subscriber number + fee) is sent to the peripheric equipment. Then the ETC sets the cell alloted to the communication free.
2. The communication is not local and is charged according to the duration, and the metering level is determined in the translator T. The concerned trunk circuit is a trunk circuit JD. When the called subscriber goes off - hook, the starting time is registered. Then the ETC scans the trunk circuit during the entire conversation to detect the end thereof. Then the end time is registered, the duration is obtained by computing the difference between the starting and end times, then the charge is computed, for example, by multiplying the duration by the metering level. At last the metering message (Calling subscriber number + fee) is transmitted to the peripheric equipment. The memory cell is set free.
3. It is a toll communication and the metering level is transmitted to the local exchange by the toll exchange. The concerned toll trunk circuit is a trunk circuit JI. The ETC by scanning the third wire of the trunk circuit receives and stores the metering level; after that the case described above in 2) applies.
4. It is a toll communication and the metering pulses are transmitted by the toll exchange. The concerned trunk circuit is a trunk circuit JIN (in order to distinguish it from the trunk circuit JI of the case 3). The ETC scans the trunk circuit third wire during the conversation and collects in its memory cell the received metering pulses. The metering message (calling subscriber number + pulse number) is sent to the peripheric equipment. The memory cell is set free.

Examples of embodiment of scanner operating in coordination with data processing devices are already known. A description of one example is given in the above mentioned French patent application.

In an embodiment of the invention, an ETC supervises trunk circuits only one time, either the JL, the JD, the JI or the JIN. The ETC has thus three basic programs: the information storing program, the trunk circuit condition detection program and the elaboration program for the metering message to be transmitted to the peripheric equipment. The first one has been described hereabove, the third one comprises normal arithmetic operations as: additions, substractions, multiplications, followed by a transfer to the peripheric equipment. Then the peripheric registration is handled in a processing center to issue the bills to be sent to the subscribers.

The second program of detection of the trunk circuit condition, while performed acording to the same techniques, varies in the four cited cases depending on the type of trunk circuit.

In any trunk circuit, regarding the metering three successive conditions are pointed out: (1) busy trunk circuit before metering (the subscribers are still not in relation), (2) busy trunk circuit with metering (during the communication) and (3) free trunk circuit (set free after the communication). The trunk circuit can by means of two relays signal the three conditions by two binary signals called "E" and "F", the meaning of which is the following:

E = o (or "E") : free trunk circuit
E = 1 (or "E") : busy trunk circuit
F = 0 (or "F") : not metered trunk circuit
F = 1 (or "F") : metered trunk circuit Therefore the three mentioned conditions are signalled by the combinations as follows:

1. busy trunk circuit before metering : E F
2. busy trunk circuit with metering : E F
3. free trunk circuit (after metering) : E F The fourth combination, E F, is a fault combination which, eventually, causes a special check program to be processed.

The supervision of those signals is made in a manner known per se by a high speed scanner and the content of the cell is only modified when the detection results in a binary signal different from the one already stored in the cell. Each registered modification directs the program performance during the next memory scannings.

In the above mentioned fourth case, it is necessary in addition to or instead of those conditions, to detect the pulses transmitted by the toll exchange and received on the trunk circuit wire C. Those pulses have a definite duration, for example of 120 *ms*; they are substantially sampled by a scanner of ETC. The cycle of this scanner must be shorter than the pulse duration to insure that no pulse is lost. However it is necessary to take care that two successive samples of the same pulse are counted only once. Such a technique is well known in the electronic switching systems using a registered program computer, wherein it is also necessary to detect and to count the dialling pulses during the dialling phase and the registration of the called subscriber numbers.

Of course hereabove it has been supposed that an ETC supervised only one type of trunk circuits, but it is possible by overlapping the programs to have an ETC supervising two or three or four types of trunk circuits.

While the principles of the present invention have been hereabove described in relation with a particular example of embodiment, it will be clearly understood that the said description is made only for the example and does not limit the scope of the invention.

We claim:

1. A central metering and supervision apparatus for a telephone exchange provided with common call completing circuits comprising registers, markers and junctors for completing connections from calling lines to trunks and from trunks to called lines, said metering and supervision apparatus comprising a coupler, a plurality of memory units, each unit including a plurality of memory cells with at least one cell allotted to each trunk, a scanner associated with each such unit, each said scanner connected to scan the trunks to determine the condition of trunks connected thereto for transmission of an indication of said condition to the associated unit for storage of such indication in the cell for that trunk, a plurality of line identifiers, means connecting an identifier to one unit for receiving calling number information therefrom on a call through a trunk found to exhibit a calling condition, means for decoding call prefix information determinative of the nature of said call, said decoding means connected through the junctor processing said call to said unit for transferring data corresponding to said call prefix information to said one unit, means in said one unit for accumulating calling line identification information, call nature data and the identity of the trunk processing said call, and means in the coupler for receiving and for storing the identity of the identifier connected to said one unit and the identity of the one unit, peripheral equipment including a peripheral memory unit, and further memory means in said one unit for storing call information in response to a call demand indicated by the presence of a decoded prefix and transmitting said information to said peripheral equipment at the termination of a call.

2. Apparatus as claimed in claim 1, in which there is scanner means for connecting each unit to any junctor through said scanner means, the scanner means cyclically scans output wires of said units, each such scanner means connecting the said scanner to a junctor to detect any indication of a call originating therefrom to shut off the said scanner means by means of a common terminate scan wire connected between the said scanner and the junctors, each line identifier includes a selection circuit of which an input wire and and output wire are respectively connected in parallel from each junctor to an appearance on each unit scanner means, the number of input wires being equal to the number of output wires, and each junctor includes switching means operative on call detection to connect the input wire of the identifier of the calling line to the wire of the scanner which has detected the call, and the concerned output wire of the said identifier to the common scan terminate wire of the said scanner.

3. Apparatus as claimed in claim 2, in which each selection circuit is provided with switching means to choose selectively a marked input wire among several marked input wires connected to several junctors, a wire loop formed from the said scanner to the said selection circuit and from the said selection circuit to the said scanner via switching means of the said coupler and selection circuit respectively, and means for connecting the selected marked input wire to the output wire connected to the same junctor to terminate scanning of the scanner which is, at that time, checking the junctor connected to the said wire over said loop.

* * * * *